Oct. 27, 1964  J. S. COURTNEY-PRATT  3,154,699
ELECTROSTATIC HIGH VOLTAGE GENERATORS
Filed Jan. 23, 1961
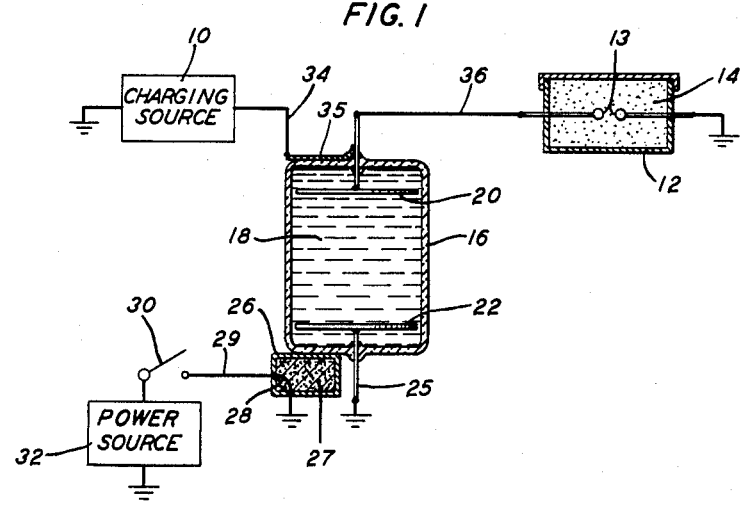
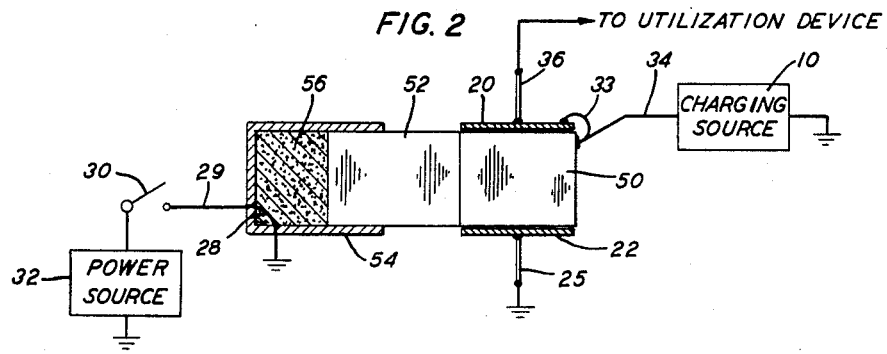
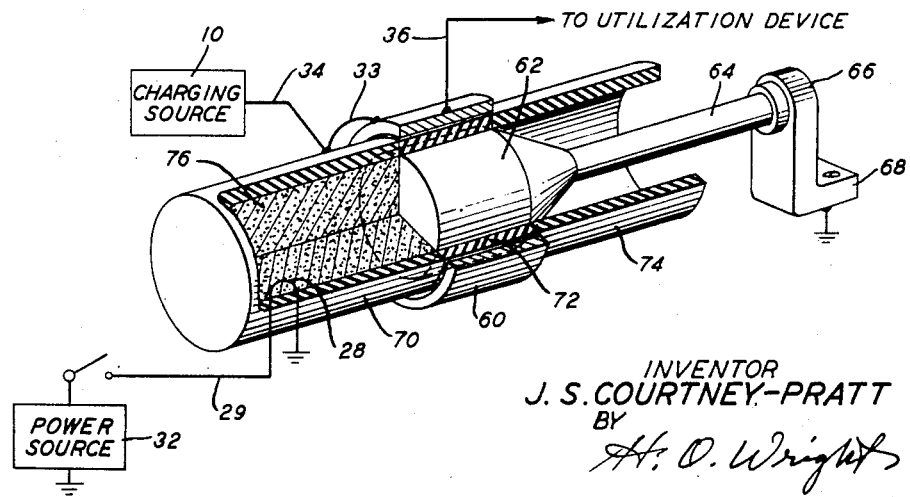
INVENTOR
J. S. COURTNEY-PRATT
BY
H. O. Wright
ATTORNEY

United States Patent Office 3,154,699
Patented Oct. 27, 1964

3,154,699
ELECTROSTATIC HIGH VOLTAGE GENERATORS
Jeofry S. Courtney-Pratt, Springfield, N.J., assignor to Bell Telephone Laboratories, Incorporated, New York, N.Y., a corporation of New York
Filed Jan. 23, 1961, Ser. No. 84,084
6 Claims. (Cl. 307—108)

This invention relates to the generation of very high voltage pulses.

Very high voltage, substantially instantaneous pulses, that is, pulses in the order of a million or more volts and a duration of a microsecond or less, are difficult to produce. Prior art methods of producing such pulses require elaborate equipment which is expensive to provide and maintain. Such pulses have many uses as, for example, in laboratory tests of various materials.

Accordingly, it is a principal object of this invention to reduce the complexity of the equipment and the cost involved in generating very high voltage, substantially instantaneous pulses.

In accordance with the present invention the above described object is realized by charging a capacitor, comprising conductive members separated by insulating material of high dielectric constant, from any of a number of well known prior art, relatively high, direct voltage sources and thereafter substantially instantaneously removing the dielectric or otherwise materially reducing the dielectric constant of the dielectric material between the conductive members. The capacitor can then be caused to deliver the resulting very high voltage pulse to an appropriate utilization device or circuit.

The above and other objects, features and advantages of the invention will be more readily perceived after perusal of the following detailed description of specific embodiments presented for the purpose of illustrating the application of the principles of the invention.

In the drawings:

FIG. 1 illustrates in diagrammatic form a specific combination of structure for practicing the invention;

FIG. 2 illustrates in diagrammatic form a second specific structure for practicing the invention; and FIG. 3 illustrates in diagrammatic form a third specific structure for practicing the invention.

Corresponding designation numbers for substantially identical structures have been employed in all three figures.

In more detail in FIG. 1, spaced conductive electrodes 20 and 22 are enclosed within a frangible container 16. Electrode 22 is grounded through lead 25 and electrode 20 is connected to lead 36. Container 16 can, for example, be of glass and is filled with a fluid 18 which has a relatively high dielectric constant and high dielectric strength. Fluid 18 can be, for example, a compressed liquid "Freon" which upon the breaking of frangible container 16 will virtually instantaneously evaporate and permit the surrounding atmosphere to occupy the space between electrodes 20 and 22, thus instantaneously reducing the dielectric constant of the material between the electrodes. "Freons" are fully halogenated hydrocarbons which are gases at atmospheric pressure and room temperature but which become liquid under sufficient compression. Numerous and varied types of "Freons" are well known and extensively used by those skilled in the art. Specific "Freons," by way of examples, are made by replacing the hydrogen in hydrocarbons such as ethane and methane by one of the halogens, that is, by chlorine, fluorine or bromine.

The upper electrode 20 is connected through a fragile lead of conductive material 35 to conductive lead 34, which in turn is connected to a source 10 of relatively high direct voltage of any of the several well known prior art high direct voltage sources. Lead 35 is made fragile so that it will break and disconnect source 10 when container 16 is shattered as will be presently described.

A container 26 filled with an explosive charge 27 is firmly attached to a surface of the frangible container 16 so that upon detonation of charge 27 container 16 will shatter, instantaneously releasing the pressure upon the compressed "Freon" 18 within the vessel and breaking lead 35 as above stated.

Charge 27 may be detonated in any of the numerous ways well known and extensively used by those skilled in the art, one simple way being indicated in FIG. 1, that is, by an electrically fusible filament 28 embedded in the charge 27, the filament being connected between ground and lead 29 which connects to switch 30. Switch 30 when closed connects power source 32 to lead 29 and thus effects the detonation of charge 27.

Lead 36 connects to a utilization device 12 for the high voltage generated by the sudden decrease in the dielectric constant of the material between electrodes 20, 22 of the charged capacitor when container 16 is shattered releasing the compressed "Freon."

Device 12 can be, for example, a closed vessel containing a mixture of gases 14. Determining the effect of a very high voltage discharge across gap 13 upon a mixture of gases 14 will be assumed, for example, to be the purpose for which the very high voltage is generated. Alternatively, such a very high voltage discharge can be employed to promote various and sundry reactions between numerous combinations of materials, as is well known in the art.

It is further assumed that gap 13 is made sufficiently wide that the voltage of source 10 is insufficient to cause a discharge across it. Alternatively, a second switch (not shown) may be connected electrically in lead 36 and mechanically interconnected with switch 30 so that the second switch will close at substantially the same time as switch 30.

In FIG. 2 a second arrangement of the invention is illustrated in which plates 20 and 22 are initially spaced on opposite sides of a block of dielectric material 50. Block 50 should be a material of high dielectric constant and high dielectric strength. Suitable materials, for example, include quartz, mica, "Teflon," "Mylar," carbon disulphide, the ferroelectric titanates, glass and numerous other materials known to those skilled in the art to possess the above described properties.

A second block 52 of dielectric material of the same cross-sectional dimensions as block 50 is attached to the left side of block 50, as shown. Block 52 should have a lower dielectric constant than block 50 but a high dielectric strength. Preferably, block 52 can have a progressively decreasing dielectric constant from right to left so that the high voltage pulse resulting from the rapid propulsion of blocks 50 and 52 to the right, as will presently be described, will have a less steeply rising leading edge or will otherwise be of more useful shape for a particular situation in which it is to be used. By way of example, assuming block 50 to be of a ferroelectric titanate, or the like, having a dielectric constant of several thousand, block 52 can be fabricated of a mixture of the ferroelectric and a matrix material such as glass, the proportion of the ferroelectric in the mixture progressively decreasing from its right to its left end. Alternatively, block 52 can be composed of several sections of successively lower dielectric constant from right to left.

Block 52 extends into the open end of fixed chamber 54 at the closed end (left) of which chamber an explosive charge 56 is located. Detonation of charge 56, substantially as described above in connection with charge 27 of FIG. 1, will then result in driving blocks 52 and 50 to the right thus instantaneously decreasing the dielectric constant of the material separating electrodes 20 and 22. Preferably, a sufficient charge is employed to propel block 52 to the right of electrodes 20 and 22. If the capacitor is initially charged from source 10 through leads 33 and 34, a high voltage pulse will result across electrodes 20 and 22 as the blocks 52 and 50 are propelled to the right by detonation of charge 56.

In this instance the short lead 33 is made fragile so that it is broken by movement of block 50 to the right thus disconnecting source 10 from the capacitor electrode 20. Leads 33 and 34 make electrical connection with each other and are mechanically fastened to the right side of block 50 by a suitably strong adhesive material as indicated in FIG. 2.

In FIG. 3 a third arrangement of the invention is illustrated. In this arrangement concentric conductive cylindrical electrodes 60 and 62 are separated by the second portion 72 of a cylinder of dielectric material consisting of the three portions 70, 72 and 74. The inner cylindrical electrode 62 has closed ends and is rigidly supported by tapered rod 64, bracket 66 and base member 68, the supporting structure also serving as an electrical ground connection.

The first portion 70 of the dielectric cylinder is closed at its left end and encloses an explosive charge 76 which can be detonated substantially as described for charge 27 of FIG. 1. Portion 70 should be mechanically strong enough to withstand the forces generated by detonation of charge 76 and should also be of high dielectric strength. Its dielectric constant need not be high. It can be mechanically re-enforced if necessary.

The second portion 72 of the dielectric cylinder is of high dielectric constant and high dielectric strength. The capacitor, consisting of electrodes 60 and 62 and portion 72 of the dielectric cylinder, is initially charged through leads 33 and 34 as for the arrangement of FIG. 2. Lead 33 is fragile and is broken by motion of the dielectric cylinder to the left upon detonation of charge 76 thus disconnecting electrode 60 from the charging source.

The third portion 74 of the dielectric cylinder is of appreciably lower dielectric constant than the second portion 72 and may have a progressively decreasing dielectric constant from left to right as described for block 52 of FIG. 2.

Detonation of charge 76 propels the dielectric cylinder toward the left substantially instantaneously replacing the second portion 72 by the third portion 74 and preferably carrying the third portion 74 to the left of the electrodes 60 and 62. The high voltage pulse thus generated between electrodes 60 and 62 is passed over lead 36 to a utilization device such for example as device 12 described above in connection with FIG. 1.

The above described specific arrangements are illustrative of the application of the principles of the invention. Numerous other arrangements and modifications of the above described arrangements can readily be devised by those skilled in the art without departing from the spirit and scope of the invention.

What is claimed is:

1. Apparatus for generating a very high voltage pulse comprising means for charging a capacitor having a dielectric of high dielectric constant and high dielectric strength from a source of direct voltage, an explosive charge and means for detonating the explosive charge, the explosive charge being adapted and arranged upon detonation to effect the instantaneous removal of the dielectric from the capacitor whereby a very high voltage pulse is generated by the capacitor.

2. The apparatus of claim 1 wherein the dielectric of the capacitor is a fluid converted to liquid form under high pressure, the liquid instantaneously volatilizing and dispersing at atmospheric pressure, the liquid being confined between the capacitor electrodes under the high pressure in a frangible vessel and the means for effecting the instantaneous removal of the dielectric is an explosive charge arranged adjacent to the vessel, and means for detonating the charge thereby shattering the frangible vessel and releasing the liquid.

3. The apparatus of claim 1 wherein the dielectric of the capacitor is a first solid member and the means for effecting the instantaneous removal of the dielectric member comprises a second solid member of lower dielectric constant and high dielectric strength arranged adjacent the first member, an explosive charge confined adjacent to the second member and means for detonating the charge whereby the first member is instantaneously ejected from between the electrodes of the capacitor and the second member is rapidly propelled between and beyond the electrodes.

4. The apparatus of claim 3 wherein the second dielectric member has a dielectric constant which progressively decreases with distance from the first dielectric member whereby the generated very high voltage pulse will have a leading edge of decreased slope.

5. The apparatus of claim 1 wherein the electrodes of the capacitor comprise concentrically positioned cylinders, the high dielectric constant dielectric comprises a median portion of a third cylinder positioned between and concentric with the electrodes, the third cylinder extending beyond the electrodes at each side, one extending portion being closed at its far end and including therein an explosive charge, the other extending portion being open at its far end and having a high dielectric strength and a dielectric constant lower than that of the median portion, and means for detonating the explosive charge whereby the dielectric cylinder may be instantaneously propelled from between and beyond the electrodes.

6. The apparatus of claim 5 wherein the other extending portion of the dielectric cylinder has a dielectric constant which decreases with distance from the median portion of the dielectric cylinder.

References Cited in the file of this patent
UNITED STATES PATENTS
2,413,391   Usselman _____ Dec. 31, 1946